Figure 1:
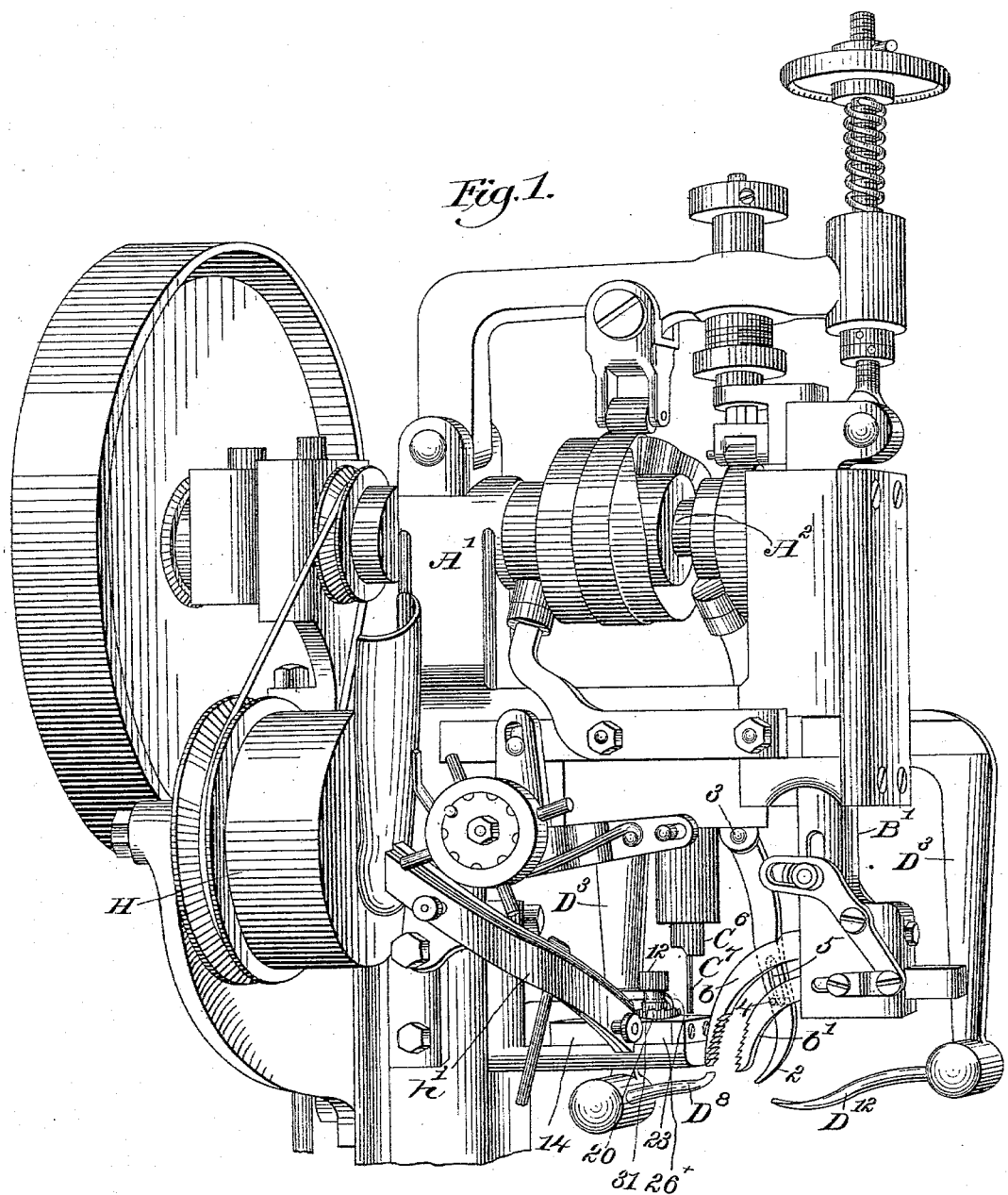

(No Model.)

C. P. LAWRENCE.
LASTING MACHINE.

No. 559,725.

2 Sheets—Sheet 1.

Patented May 5, 1896.

Witnesses.
Fred N. Ashworth
Louis N. Gowell

Inventor:
Charles P. Lawrence
by Crosby & Gregory
Attys.

(No Model.) 2 Sheets—Sheet 2.
C. P. LAWRENCE.
LASTING MACHINE.
No. 559,725. Patented May 5, 1896.
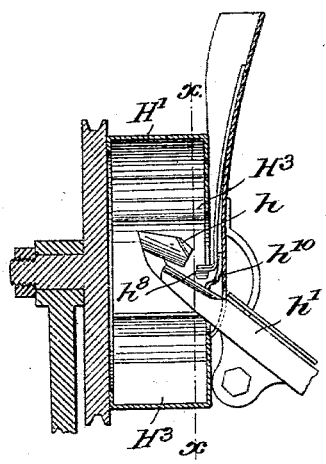
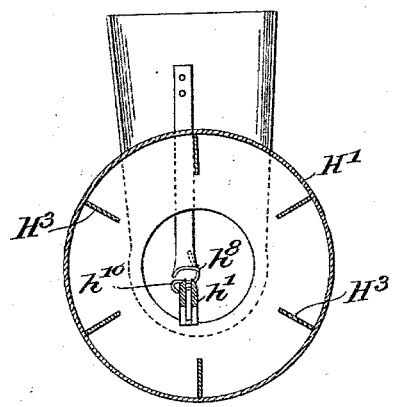
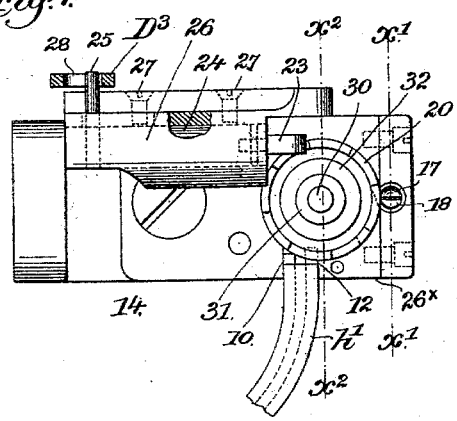
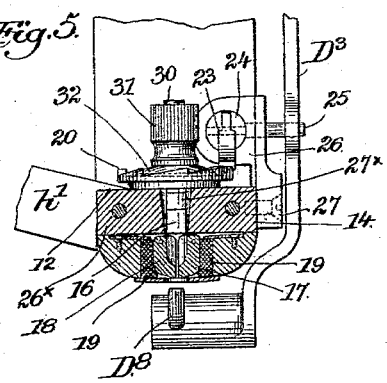
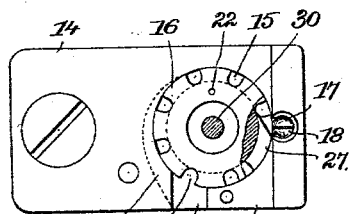
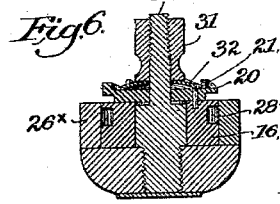
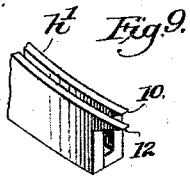
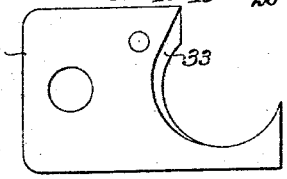
Witnesses.
John P. L. Printlet
Fred S. Greenleaf.
Inventor:
Charles P. Lawrence
by Crosby Gregory
Attys

UNITED STATES PATENT OFFICE.

CHARLES P. LAWRENCE, OF MECHANIC FALLS, MAINE.

LASTING-MACHINE.

SPECIFICATION forming part of Letters Patent No. 559,725, dated May 5, 1896.

Application filed July 14, 1892. Serial No. 439,992. (No model.)

*To all whom it may concern:*

Be it known that I, CHARLES P. LAWRENCE, of Mechanic Falls, county of Androscoggin, State of Maine, have invented an Improvement in Lasting-Machines, of which the following description, in connection with the accompanying drawings, is a specification, like letters and figures on the drawings representing like parts.

This invention has for its object to improve that class of lasting-machines wherein the edge of the upper is grasped between pincers or jaws and stretched and laid over upon the inner sole on the last, and especially on the machine shown in United States Patent No. 476,206, granted to me, dated May 31, 1892.

In this my present invention I have improved the mechanism for assorting and presenting the tacks in the path of the driver to be driven into the upper while held by the nippers; and the particular features in which my invention consists will be hereinafter described in the specification and defined in the claims at the end thereof.

Figure 1 is a perspective view of a sufficient portion of a lasting-machine with my improvements added to enable my invention to be understood. Fig. 2 is a sectional detail of the hopper, the upper end of the raceway, and the shield and knock-off device. Fig. 3 is a section in the line $x$, Fig. 2. Fig. 4 is an enlarged plan view of the foot and the lower end of the raceway. Fig. 5 is a section in the line $x'$, Fig. 4, of the parts shown in that figure. Fig. 6 is a section on the line $x^2$, Fig. 4. Fig. 7 shows part of the foot, the ratchet for rotating the tack-carrying wheel being removed. Fig. 8 shows the cover-piece of the foot removed. Fig. 9 shows the lower end of the raceway. Fig. 10 shows the stripper.

The head $A'$, the main shaft $A^2$, the carriage or nipper-support $B'$, the nippers $b$ $b'$, their actuating devices, the yoke $D^3$, the means for sliding it, the strut $D^{12}$ to bear on the inner sole near its center line, the driver-bar $C^6$, its attached driver $C^7$, the edge-gage $D^8$, the rotating nail-hopper $H'$, and their actuating devices are and may be all substantially as in said patent, so said parts need not be herein more fully described. I have added to the machine referred to an auxiliary holddown 2, it being pivoted to a part of the head at 3, so that the working end of said holddown may be made to bear upon the inner sole near the edge and near the upper when the nippers closed upon the upper, as provided for in said patent, are being lifted to stretch the upper and fit it to the top of the last; but said auxiliary holddown is not herein claimed broadly, as it is made the subject-matter of another application, Serial No. 497,614, filed January 2, 1894. In this present illustration of my invention I have made the nipper $b'$ the mover for the auxiliary holddown, and to avail myself of the said nipper for this purpose I have provided the nipper with a pin or stud 4 to enter a long slot 5 in the said holddown, and in this way the holddown is made to follow the nipper in its approach toward and retirement from the upper during the operation of grasping the upper, stretching the same, and laying it over upon the inner sole.

It sometimes happens that the nails become improperly lodged on the raceway, and to obviate this I have arranged above the raceway $h'$ and just below the shelf $h$, common to said patent, a shield $h^8$, having a convexed back and overlapping the raceway, so that nails lifted by the shelves $H^3$ of the hopper and which drop crosswise will strike said shield and fall back into the hopper. Between the under side of this shield and the upper side of the raceway I have located a knock-off $h^{10}$, which will dislodge any nail lying across the raceway.

By the use of the shield and knock-off device I find that the raceway-slot may be kept well filled with nails hanging therein point down. The lower end of the raceway is notched, as shown in Fig. 9, to leave two prongs 10 12 to enter a notch 13 in a foot 14, the prong 10 being shorter than the prong 12, to thus enable a tack which has passed from the end of the raceway-slot into a notch 15 in a feed-wheel 16 to pass the said prong. This feed-wheel (shown best in Figs. 6 and 7) has a series of notches 15 to receive tacks in succession, and in the rotation of the wheel carry the tacks into position under the driver and over a nose-piece, forming part of the foot and shown best in Fig. 5, said nose consisting essentially of two pivoted arms or jaws 17 18, acted upon by springs 19, preferably blocks of rubber, the said arms yielding to the passage of the tack and the driver between them and serving to keep the tack in vertical position while being driven into the material held by the nippers or laid over on the inner sole.

The tack-feeding wheel 16 has operatively connected to it a ratchet-wheel 20, the connection being by a suitable projection, as 21, on one entering a notch or hole 22 of the other, such form of connection affording ready means for dismemberment of the parts. This ratchet-wheel derives its step-by-step movement from a pawl 23, connected to a pawl-carrier 24, (shown as a rod having a stud 25,) extended through a slot in a guide 26. (Shown as attached to the said foot by screws 27 27.)

The stud 25 enters a slot 28 (see Fig. 4) in the innermost leg of the slide-frame $D^3$, moved longitudinally as provided for in the said patent, and to provide for the necessary lost motion, so as to move the pawl and ratchet for only the proper distance, the said slot is made in practice about five-sixteenths of an inch long.

The foot has a detachable cover-piece $26^\times$, provided with a stripper $27^\times$, which enters the groove $28^\times$ of the feed-wheel, said stripper serving to direct the said tacks outwardly in succession from the said feed-wheel into the driver and nail-passage of the foot. The foot has erected on it a stud or pivot 30, about which rotates as a center the said feed-wheel, and the feed-wheel and ratchet are kept down on the said stud by a suitable nut 31, a friction device 32, shown as a sheet-steel washer, but which may be of any other suitable material, being interposed between the said nut and the upper side of the said ratchet to prevent any retrograde or back movement of the said feed-wheel.

In my experiments I found considerable trouble at first in taking the tacks from the end of the raceway by the feed-wheel alone, and I discovered that frequently a tack, the head of which was not riding snugly on the roadway, would but partially descend in the notch in the feed-wheel, and as a result thereof the said tack would, in the rotation of the feed-wheel, be inclined from a vertical position, and the body of the tack near the point would cross the lower part of the feed-wheel between adjacent notches, and such wrongly-supported tack would be jammed between the feed-wheel and the inner wall of the cavity in the foot in which the feed-wheel was located. To overcome this difficulty, I undercut the wall 33 of the foot, so that the point of such a tack could travel with the feed-wheel and after one or two movements of the wheel, due to the attendant vibration and shaking of the parts, would fully drop and right itself in the notches of the feed-wheel.

I claim—

1. The raceway having prongs 10, 12 at its lower end, the foot 14, notched to receive and be engaged by such prongs, one of the said prongs being shorter than the other to permit the passage or feed of the tack, the said foot having a nail-passage, the rotating feed-wheel 16 mounted in said foot and provided with notches 15 to receive tacks in succession and having the peripheral groove $28^\times$, the foot cover-piece $26^\times$, and the stripper $27^\times$ thereon, which enters the groove to direct the tacks outwardly in succession from the said feed-wheel into the driver and nail-passage of the foot, substantially as described.

2. The combination with a hopper, and a raceway to conduct tacks to a driver, of a shield having a convex surface made to cover the upper end of the raceway below the shelf upon which are deposited the tacks which are to travel down the said raceway, and with a knock-off located between the under side of the said shield, and the upper side of the said raceway, to operate, substantially as described.

3. The combination with the raceway, and the foot having the undercut wall 33, of a rotating feed-wheel having notches for the reception of nails directly from the said raceway, substantially as described.

In testimony whereof I have signed my name to this specification in the presence of two subscribing witnesses.

CHARLES P. LAWRENCE.

Witnesses:
RUFUS K. BOWKER,
GEORGE F. NEEDHAM.